(12) United States Patent
Ihara et al.

(10) Patent No.: US 12,337,278 B2
(45) Date of Patent: Jun. 24, 2025

(54) CARBON-DIOXIDE CAPTURE AND TREATMENT SYSTEM AND CARBON-DIOXIDE NEGATIVE EMISSIONS PLANT

(71) Applicant: NITTO DENKO CORPORATION, Ibaraki (JP)

(72) Inventors: Terukazu Ihara, Ibaraki (JP); Shinya Nishiyama, Ibaraki (JP); Kensuke Tani, Ibaraki (JP); Hirokazu Matsuda, Ibaraki (JP); Satoru Suzuki, Ibaraki (JP); Koso Matsuda, Ibaraki (JP); Hiroyuki Katayama, Ibaraki (JP)

(73) Assignee: NITTO DENKO CORPORATION, Ibaraki (JP)

(*) Notice: Subject to any disclaimer, the term of this patent is extended or adjusted under 35 U.S.C. 154(b) by 437 days.

(21) Appl. No.: 17/925,248

(22) PCT Filed: Apr. 23, 2021

(86) PCT No.: PCT/JP2021/016455
§ 371 (c)(1),
(2) Date: Nov. 14, 2022

(87) PCT Pub. No.: WO2021/230045
PCT Pub. Date: Nov. 18, 2021

(65) Prior Publication Data
US 2023/0302403 A1 Sep. 28, 2023

(30) Foreign Application Priority Data
May 14, 2020 (JP) .................................. 2020-084913

(51) Int. Cl.
*B01D 53/62* (2006.01)
*B01D 53/75* (2006.01)

(52) U.S. Cl.
CPC .............. *B01D 53/62* (2013.01); *B01D 53/75* (2013.01); *B01D 2257/504* (2013.01); *B01D 2258/06* (2013.01)

(58) Field of Classification Search
CPC .............. B01D 53/0438; B01D 53/226; B01D 53/229; B01D 53/62; B01D 53/75; B01D 53/81; B01D 53/82
See application file for complete search history.

(56) References Cited

U.S. PATENT DOCUMENTS 5,928,806 A   7/1999   Olah et al.
8,557,027 B2  10/2013  Peiffer et al.
(Continued)

FOREIGN PATENT DOCUMENTS

JP  2001-524257 A  11/2001
JP  2010-533784 A  10/2010
(Continued)

OTHER PUBLICATIONS

International Search Report issued on Jul. 13, 2021, for corresponding International Patent Application No. PCT/JP2021/016455, along with an English translation (8 pages).
(Continued)

*Primary Examiner* — Sharon Pregler
(74) *Attorney, Agent, or Firm* — Hauptman Ham, LLP (57) ABSTRACT

Provided is a carbon-dioxide capture and treatment system comprising: a carbon dioxide-enriched mixture gas generation device comprising a separation membrane capable of increasing a carbon dioxide concentration of a mixture gas taken therein, thereby generating a carbon dioxide-enriched mixture gas; a carbon dioxide conversion device configured to convert carbon dioxide in the enriched mixture gas received from the carbon dioxide-enriched mixture gas generation device, into a chemically stable compound; a (Continued)

final treatment device comprising an adsorbent, wherein the final treatment device is configured to adsorb the carbon dioxide by the adsorbent, thereby separating the carbon dioxide from other gas components; and a carbon dioxide direct capture device configured to take in air contained in an ambient environment, and supply the taken-in air to the final treatment device or an upstream side thereof in the carbon-dioxide capture and treatment system.

18 Claims, 5 Drawing Sheets

(56) References Cited

U.S. PATENT DOCUMENTS

| | | |
|---|---|---|
| 2008/0289319 A1 | 11/2008 | Eisenberger et al. |
| 2008/0289495 A1 | 11/2008 | Eisenberger et al. |
| 2008/0289499 A1 | 11/2008 | Eisenberger et al. |
| 2008/0289500 A1 | 11/2008 | Eisenberger et al. |
| 2009/0014336 A1 | 1/2009 | Olah et al. |
| 2010/0132259 A1 | 6/2010 | Haque |
| 2010/0193370 A1 | 8/2010 | Olah et al. |
| 2010/0254883 A1* | 10/2010 | Eisenberger ....... B01D 53/1475 422/612 |
| 2010/0319537 A1 | 12/2010 | Eisenberger et al. |
| 2011/0000371 A1 | 1/2011 | Eisenberger et al. |
| 2011/0011945 A1 | 1/2011 | Eisenberger et al. |
| 2011/0041688 A1 | 2/2011 | Eisenberger |
| 2011/0237830 A1 | 9/2011 | Masel |
| 2012/0000364 A1 | 1/2012 | Eisenberger et al. |
| 2012/0125157 A1 | 5/2012 | Duarte-Escareno et al. |
| 2012/0167764 A1 | 7/2012 | Eisenberger |
| 2012/0174778 A1 | 7/2012 | Eisenberger |
| 2012/0174779 A1 | 7/2012 | Eisenberger |
| 2012/0174780 A1 | 7/2012 | Eisenberger |
| 2012/0174781 A1 | 7/2012 | Eisenberger |
| 2012/0174793 A1 | 7/2012 | Eisenberger |
| 2012/0308903 A1 | 12/2012 | Masel |
| 2013/0015064 A1 | 1/2013 | Masel et al. |
| 2013/0023404 A1 | 1/2013 | Masel et al. |
| 2013/0055894 A1 | 3/2013 | Eisenberger |
| 2013/0075273 A1 | 3/2013 | Masel et al. |
| 2013/0131199 A1* | 5/2013 | Lien ................. C01B 3/342 252/373 |
| 2013/0157174 A1 | 6/2013 | Masel et al. |
| 2014/0004016 A1 | 1/2014 | Eisenberger et al. |
| 2014/0093799 A1 | 4/2014 | Masel et al. |
| 2014/0130670 A1 | 5/2014 | Eisenberger et al. |
| 2014/0239231 A1 | 8/2014 | Masel et al. |
| 2015/0027308 A1 | 1/2015 | Eisenberger et al. |
| 2015/0122640 A1 | 5/2015 | Masel et al. |
| 2015/0174522 A1 | 6/2015 | Eisenberger et al. |
| 2015/0209722 A1 | 7/2015 | Masel et al. |
| 2015/0251130 A1 | 9/2015 | Eisenberger et al. |
| 2015/0298049 A1 | 10/2015 | Eisenberger |
| 2015/0376802 A1 | 12/2015 | Masel et al. |
| 2016/0107154 A1 | 4/2016 | Masel et al. |
| 2016/0108530 A1 | 4/2016 | Vasel et al. |
| 2016/0207866 A1 | 7/2016 | Masel et al. |
| 2016/0251766 A1 | 9/2016 | Masel et al. |
| 2016/0327508 A1 | 11/2016 | Masel et al. |
| 2016/0369415 A1 | 12/2016 | Masel et al. |
| 2017/0022618 A1 | 1/2017 | Masel et al. |
| 2017/0037522 A1 | 2/2017 | Kaczur et al. |
| 2017/0128930 A1 | 5/2017 | Masel et al. |
| 2017/0189898 A1 | 7/2017 | Masel et al. |
| 2017/0233881 A1 | 8/2017 | Masel et al. |
| 2017/0259206 A1 | 9/2017 | Masel et al. |
| 2017/0327959 A1 | 11/2017 | Krüger et al. |
| 2018/0057439 A1 | 3/2018 | Masel et al. |
| 2018/0111083 A1 | 4/2018 | Masel |
| 2018/0127668 A1 | 5/2018 | Masel |
| 2018/0171495 A1 | 6/2018 | Masel et al. |
| 2019/0010620 A1 | 1/2019 | Kaczur et al. |
| 2019/0071788 A1 | 3/2019 | Masel et al. |
| 2019/0085471 A1 | 3/2019 | Masel et al. |
| 2019/0127863 A1 | 5/2019 | Masel et al. |
| 2019/0135726 A1 | 5/2019 | Masel et al. |
| 2019/0211463 A1 | 7/2019 | Masel |
| 2020/0030787 A1 | 1/2020 | Masel et al. |
| 2020/0063273 A1 | 2/2020 | Masel |

FOREIGN PATENT DOCUMENTS

| | | |
|---|---|---|
| JP | 2012-510427 A | 5/2012 |
| JP | 2012-520766 A | 9/2012 |
| JP | 2013-501140 A | 1/2013 |
| JP | 2013-538772 A | 10/2013 |
| JP | 2017-47412 A | 3/2017 |
| JP | 2017-536845 A | 12/2017 |
| JP | 2020-500258 A | 1/2020 |

OTHER PUBLICATIONS

Written Opinion issued on Jul. 13, 2021, for corresponding International Patent Application No. PCT/JP2021/016455 (5 pages).
"Carbon Recycling", Agency for Natural Resources and Energy, Apr. 11, 2019, cited in the Specification, with partial English translation (8 pages).

* cited by examiner

CARBON-DIOXIDE CAPTURE AND TREATMENT SYSTEM AND CARBON-DIOXIDE NEGATIVE EMISSIONS PLANT

CROSS REFERENCE TO RELATED APPLICATION

This application is a National Stage of International Application No. PCT/JP2021/016455, filed on Apr. 23, 2021, which designates the United States and was published in Japan, and which is based upon and claims priority to Japanese Patent Application No. 2020-084913, filed on May 14, 2020 in the Japan Patent Office. All of the aforementioned applications are hereby incorporated by reference in their entireties.

TECHNICAL FIELD

The present invention relates to a negative emissions plant, and a carbon-dioxide capture and treatment system advantageously usable in such a plant. In particular, the present invention relates to a negative emissions plant comprising a facility which produces emissions including carbon dioxide during its operation, wherein the negative emissions plant is capable of allowing carbon dioxide emissions from the plant to the outside to have a negative value.

BACKGROUND ART

For example, thermal power plants and other facilities which use fossil fuels as their energy source are considered a problem as a source of environmental pollution, because a large amount of carbon dioxide as acid gas causing global warming is emitted during their operation. Heretofore, various techniques have been developed to address the problem of emission of carbon dioxide as the above acidic gas. As one example, a technique of: taking in environmental air; separating carbon dioxide from the taken-in air; and returning only carbon dioxide-free gases to the ambient air attracts attention as a direct air capture (DAC) technique.

In this DAC technique, an adsorption-desorption material is used which is capable of adsorbing carbon dioxide under an adsorption condition, and desorbing the adsorbed carbon dioxide under a desorption condition. Examples of materials which could be used for this purpose include an amine epoxy based polymer described in JP-A 2017-047412 (Patent Document 1), and polyethylenimine described in U.S. Pat. No. 8,557,027 (Patent Document 2).

Technical development is also being advanced for the purge or effective utilization of carbon dioxide separated from air by the DAC technique. For example, "Carbon Recycling" (Non-Patent Document 1), the Carbon Recycling Promotion Office, Director-General's Secretariat, Agency for Natural Resources and Energy, Apr. 11, 2019, describes a concept to collect and reuse carbon dioxide contained in emission gas of a plant. The Non-Patent Document 1 further describes aiming for negative emission by the DAC technique. However, in the Non-Patent Document 1, there is no teaching about means for achieving the technical problem, i.e., by what technical means negative emissions can be realized.

CITATION LIST

Patent Document

Patent Document 1: JP-A 2017-047412
Patent Document 2: US-B 8557027

Non-Patent Document

Non-Patent Document 1: "Carbon Recycling", Agency for Natural Resources and Energy, Apr. 11, 2019

SUMMARY OF INVENTION

Technical Problem

Under the background as described above, a main technical problem to be solved by the present invention is to establish a technique for negative emissions plants, which is capable of allowing carbon dioxide emissions from the plant to the outside to have a negative value. Here, the phrase "allowing the carbon dioxide emissions to have a negative value" means not only completely eliminating a situation where carbon dioxide generated inside the plant is emitted to the outside of the plant, but also allowing carbon dioxide emissions to the outside of the plant to have a negative value, when seeing the entire plant, by taking in carbon dioxide contained in air around the plant and preventing the taken-in carbon dioxide from being emitted to the outside of the plant.

Solution to Technical Problem

According to a first aspect of the present invention, there is provided a carbon-dioxide negative emissions plant comprising: a facility which produces emissions including carbon dioxide during its operation; and a carbon-dioxide capture and treatment system. In this carbon-dioxide negative emissions plant, the carbon-dioxide capture and treatment system comprises a carbon dioxide-enriched mixture gas generation device, a carbon dioxide conversion device, a final treatment device, and a carbon dioxide direct capture device.

The carbon dioxide-enriched mixture gas generation device comprises: an introduction part for taking in a carbon dioxide-containing mixture gas including at least the emissions from the facility; a separation membrane capable of increasing a carbon dioxide concentration of the mixture gas, thereby generating a carbon dioxide-enriched mixture gas; an enriched mixture gas discharge part for discharging the carbon dioxide-enriched mixture gas; and a residual mixture gas discharge part for discharging a residual mixture gas containing a low-concentrated carbon dioxide remaining after generation of the carbon dioxide-enriched mixture gas.

The carbon dioxide conversion device is connected to the enriched mixture gas discharge part of the carbon dioxide-enriched mixture gas generation device to receive the carbon dioxide-enriched mixture gas from the carbon dioxide-enriched mixture gas generation device, wherein the carbon dioxide conversion device is configured to convert carbon dioxide in the received carbon dioxide-enriched mixture gas into a chemically stable compound, and discharge a final residual gas remaining after the conversion, from a discharge part of the carbon dioxide conversion device.

The final treatment device comprises an adsorbent capable of adsorbing carbon dioxide, thereby separating the carbon dioxide from other gas components, wherein the final treatment device is configured to receive the final residual gas from the discharge part of the carbon dioxide conversion device, and after adsorbing by the adsorbent a residual carbon dioxide in the final residual gas received from the carbon dioxide conversion device, discharge a substantially carbon dioxide-free gas.

The carbon dioxide direct capture device is configured to take in air contained in an ambient environment, and supply the taken-in air to the final treatment device or an upstream side thereof in the carbon-dioxide capture and treatment system.

In the first aspect of the present invention having the above feature, the carbon-dioxide capture and treatment system comprises the carbon dioxide-enriched mixture gas generation device, the carbon dioxide conversion device, and the final treatment device, so that carbon dioxide produced in the plant is completely treated within the plant, without being emitted to the outside of the plant. Further, the carbon dioxide direct capture device is operable to take in air contained in an ambient environment, and subject the taken-in air to treatment similar to that for plant emission gas, so that it is possible to achieve negative emissions.

Preferably, in the first aspect of the present invention, the carbon-dioxide capture and treatment system is configured such that the enriched mixture gas discharge part is in a reduced-pressure state, and the emissions from the facility are introduced into the introduction part of the carbon dioxide-enriched mixture gas generation device. Preferably, in the first aspect of the present invention, the separation membrane of the carbon dioxide-enriched mixture gas generation device is composed of a plurality of series-connected separation membranes. Preferably, in the first aspect of the present invention, the carbon-dioxide capture and treatment system is configured such that the final residual gas from the discharge part of the carbon dioxide conversion device is transferred to the final treatment device via the carbon dioxide-enriched mixture gas generation device.

Preferably, in the first aspect of the present invention, the carbon dioxide direct capture device is disposed to distribute the air taken in from the ambient environment to the final treatment device of the carbon-dioxide capture and treatment system. Preferably, in the first aspect of the present invention, the emissions including carbon dioxide, produced in the facility, has a carbon dioxide concentration of 1.5 wt % or more.

Preferably, in the first aspect of the present invention, the final treatment device comprises a collection vessel, wherein the final treatment device is configured to collect carbon dioxide adsorbed by the adsorbent to the collection vessel under conditions of heating and/or reduced pressure, wherein in the case where the collection is performed under heating, the final treatment device is configured to utilize exhaust heat from a product manufacturing facility for heating during the collection. Preferably, in the first aspect of the present invention, the carbon dioxide conversion device is configured to convert carbon dioxide in the received carbon dioxide-enriched mixture gas into carbonate such as calcium carbonate, and discharge the resulting residual mixture gas from the discharge part of the carbon dioxide conversion device. In the first aspect of the present invention, the carbon-dioxide capture and treatment system may be configured to be driven by natural energy.

According to a second aspect of the present invention, there is provided a carbon-dioxide capture and treatment system for capturing and treating carbon dioxide. This carbon-dioxide capture and treatment system comprises a carbon dioxide-enriched mixture gas generation device, a carbon dioxide conversion device, a final treatment device, and a carbon dioxide direct capture device.

The carbon dioxide-enriched mixture gas generation device comprises an introduction part for taking in a carbon dioxide-containing mixture gas, a separation membrane capable of increasing a carbon dioxide concentration of the mixture gas, thereby generating a carbon dioxide-enriched mixture gas, an enriched mixture gas discharge part for discharging the carbon dioxide-enriched mixture gas, and a residual mixture gas discharge part for discharging a residual mixture gas containing a low-concentrated carbon dioxide remaining after generation of the carbon dioxide-enriched mixture gas.

The carbon dioxide conversion device is connected to the enriched mixture gas discharge part of the carbon dioxide-enriched mixture gas generation device to receive the carbon dioxide-enriched mixture gas from the carbon dioxide-enriched mixture gas generation device, wherein the carbon dioxide conversion device is configured to convert carbon dioxide in the received carbon dioxide-enriched mixture gas into a chemically stable compound, and discharge a final residual gas remaining after the conversion, from a discharge part of the carbon dioxide conversion device.

The final treatment device comprising an adsorbent capable of adsorbing carbon dioxide, thereby separating the carbon dioxide from other gas components, wherein the final treatment device is configured to receive the final residual gas from the carbon dioxide conversion device, and after adsorbing by the adsorbent a residual carbon dioxide in the final residual gas received from the carbon dioxide conversion device, discharge a substantially carbon dioxide-free gas.

The carbon dioxide direct capture device is configured to take in air contained in an ambient environment, and supply the taken-in air to the final treatment device or an upstream side thereof in the carbon-dioxide capture and treatment system.

Preferably in the second aspect of the present invention, the carbon-dioxide capture and treatment system is configured such that the final residual gas from the discharge part of the carbon dioxide conversion device is transferred to the final treatment device via the carbon dioxide-enriched mixture gas generation device.

According to a third aspect of the present invention, there is provided a carbon-dioxide negative emissions plant comprising: an emissions collection and separation facility configured to collect emissions from an emissions-producing facility, and separate carbon dioxide from other components in the emissions to generate a carbon dioxide-containing gas; a conversion facility configured to receive the carbon dioxide-containing gas generated in the emissions collection and separation facility, from the emissions collection and separation facility, and convert carbon dioxide contained in the carbon dioxide-containing gas into a chemically stable hydrogen-containing compound; a hydrogen generation facility configured to receive the hydrogen-containing compound generated through the conversion facility, and decompose the received hydrogen-containing compound to generate hydrogen; a first power generation facility configured to generate electric power by using the hydrogen as an energy source, and supply the generated electric power to the emissions-producing facility; and a second power generation facility configured to generate electric power by natural energy, and supply the generated electric power to the emissions-producing facility.

In the third aspect of the present invention, the emissions collection and separation facility may be configured to comprise an enrichment device for generating a carbon dioxide-containing gas through the use of a separation membrane. In this case, the separation membrane may include a plurality of separation membranes, wherein part of the plurality of separation membranes may make up the enrichment device, and the remaining one or more separation membranes may make up a residual carbon dioxide separation device capable of separating a residual carbon dioxide remaining in a residual gas after generation of the carbon dioxide-containing gas by the enrichment device, from other components in the emissions.

The carbon-dioxide negative emissions plant according to the third aspect of the present invention may further comprise a plant cultivation facility, wherein the carbon-dioxide negative emissions plant may be configured to supply at least part of the carbon dioxide-containing gas from the emissions collection and separation facility to the plant cultivation facility.

Effect of Invention

The present invention provides the carbon-dioxide negative emissions plant and the carbon-dioxide capture and treatment system having the above features, so that the present invention makes it possible to not only completely eliminate a situation where carbon dioxide generated inside the plant is emitted to the outside of the plant, but also allow carbon dioxide emissions to the outside of the plant to have a negative value, when seeing the entire plant, by taking in carbon dioxide contained in air around the plant and preventing the taken-in carbon dioxide from being emitted to the outside of the plant.

BRIEF DESCRIPTION OF DRAWINGS

FIG. 4 illustrates a state in which residual carbon dioxide in a final residual gas is adsorbed using an adsorbent, wherein FIGS. 4(a) and 4(b) show an adsorption process, and a desorption process, respectively.

DESCRIPTION OF EMBODIMENTS

Figure 1:
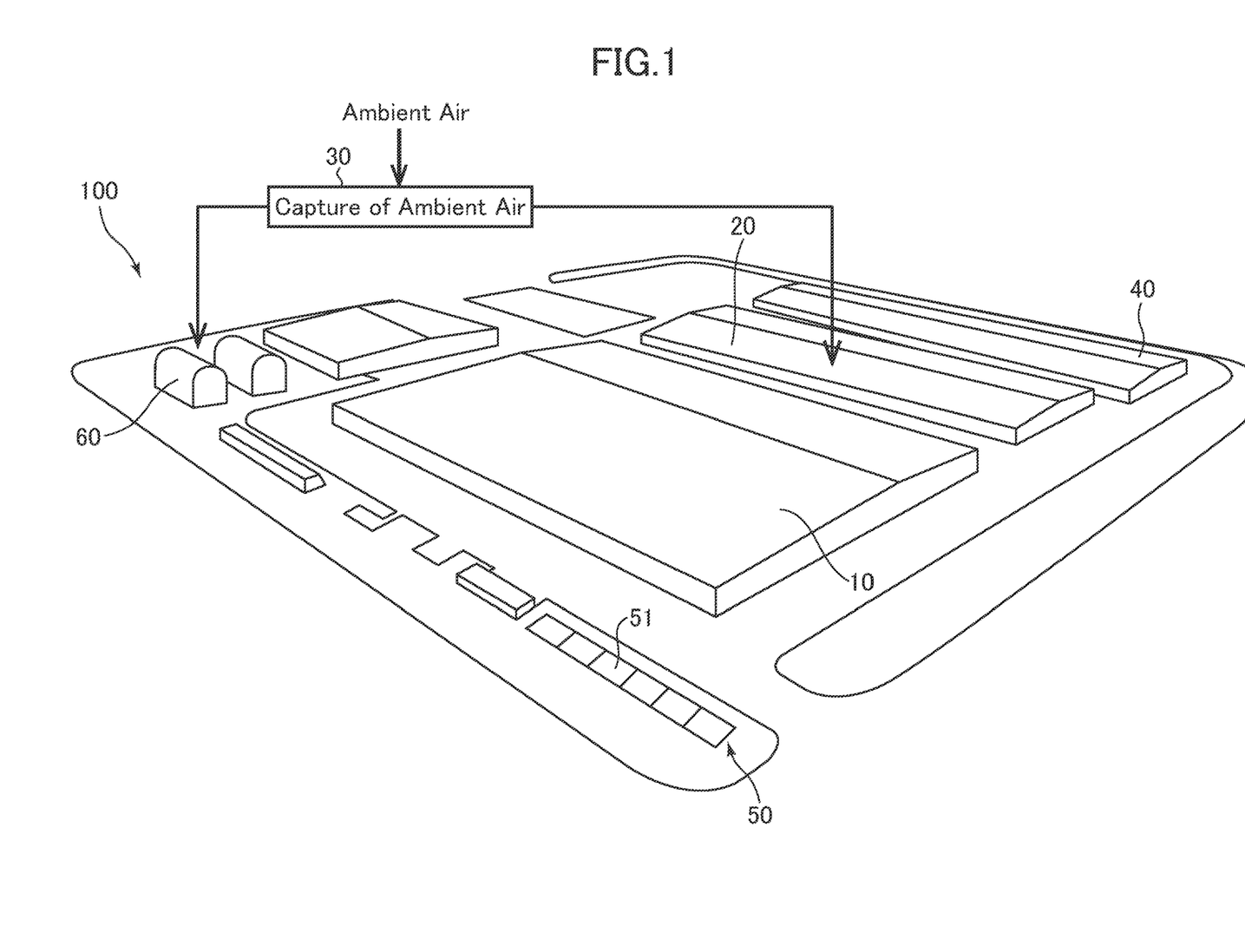
FIG. 1 is a perspective view showing the entirety of a plant as one example of a carbon-dioxide ($CO_2$) negative emissions plant according to one embodiment of the present invention.

FIG. 1 shows the entirety of a carbon-dioxide ($CO_2$) negative emissions plant according to one embodiment of the present invention. The $CO_2$ negative emissions plant 100 according to this embodiment comprises, as a plant facility, a product manufacturing facility, specifically as one example, a tape manufacturing facility 10, provided on the ground thereof. An emission gas collection and treatment building 20 is provided adjacent to the facility 10, and emission gas emitted from the facility 10 is introduced to the emission gas collection and treatment building 20. The plant 100 further comprises a direct air capture device 30 configured to take in air contained in an ambient environment of the plant 100, and send the taken-in air to the emission gas collection and treatment building 20 for treatment. This direct air capture device 30 is generally referred to as "DAC device".

In the plant 100, a power generation building is provided adjacent to the emission gas collection and treatment building 20 to serve as a first power generation facility 40 configured to generate electric power by energy obtained from substances produced in the emission gas collection and treatment building 20, as will be described in detail later. Further, a photovoltaic facility such as solar panels 51, or a power generation facility using biomass fuel as an energy source may be optionally provided as a second power generation facility 50. The plant 100 may further comprise a plant cultivation facility 60 for utilizing exhaust heat of the plant 100, and effectively utilizing carbon dioxide collected and/or treated within the plant 100.

Figure 2:
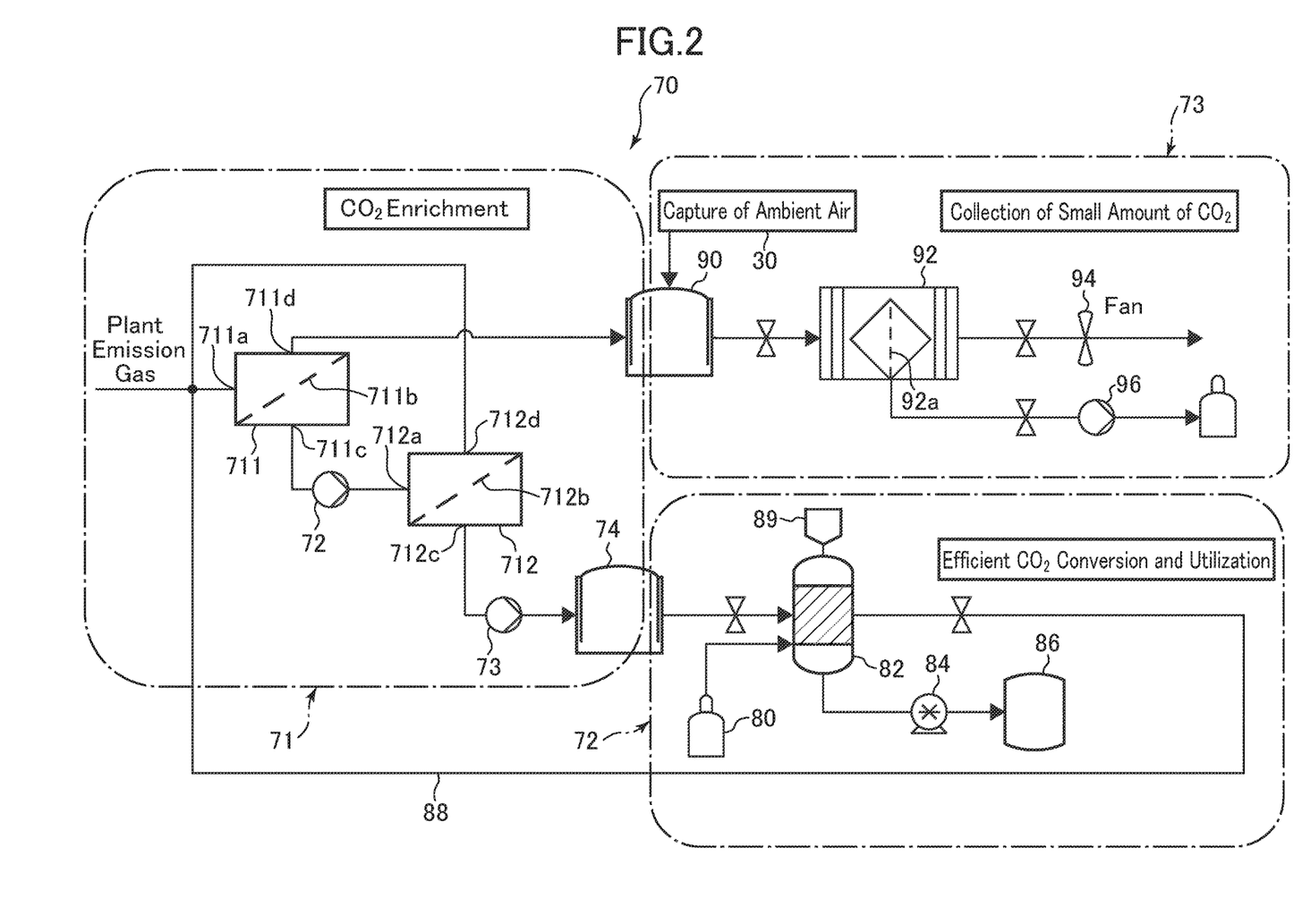
FIG. 2 is a schematic diagram showing one example of a carbon-dioxide capture and treatment system usable in the $CO_2$ negative emissions plant illustrated in FIG. 1.

FIG. 2 is a system diagram of a carbon-dioxide capture and treatment system according to one embodiment of the present invention. In FIG. 2, the entirety of the carbon-dioxide capture and treatment system is designated by the reference sign 70. This system 70 comprises a carbon dioxide-enriched mixture gas generation device 71, a carbon dioxide conversion device 72, and a final treatment device 73.

The carbon dioxide-enriched mixture gas generation device 71 comprises a first-stage $CO_2$ separation membrane module 711, and a second-stage $CO_2$ separation membrane module 712. The first-stage $CO_2$ separation membrane module 711 has an inlet port 711a connected to an emission gas collection duct system (not illustrated) for collecting emission gas of the facility 10. The first-stage $CO_2$ separation membrane module 711 has a $CO_2$ separation membrane 711b capable of allowing carbon dioxide molecules contained in the emission gas to be transmitted therethrough, but preventing other substances from being transmitted therethrough, wherein a first-stage enriched gas transmitted through the $CO_2$ separation membrane 711b and containing carbon dioxide in a high concentration is let out of the first-stage $CO_2$ separation membrane module 711 from an outlet port 711c thereof. On the other hand, a first-stage residual gas containing the substances which could not be transmitted through the $CO_2$ separation membrane 711b and having a low carbon dioxide concentration is discharged from an outlet port 711d to the outside of the first-stage $CO_2$ separation membrane module 711. The second-stage $CO_2$ separation membrane module 712 has a similar configuration to that of the first-stage $CO_2$ separation membrane module 711, and comprises a $CO_2$ separation membrane 712b, an inlet port 712a provided on one side of the $CO_2$ separation membrane 712b, and an outlet port 712c provided on the other side of the $CO_2$ separation membrane 712b.

The outlet port 711c of the first-stage $CO_2$ separation membrane module 711 and the inlet port 712a of the second-stage $CO_2$ separation membrane module 712 are connected together via a suction pump 72 configured to generate flow from the first-stage $CO_2$ separation membrane module 711 to the second-stage $CO_2$ separation membrane module 712. The outlet port 712c of the second-stage $CO_2$ separation membrane module 712 is connected to a mixture gas buffer vessel 74 disposed in a carbon dioxide-enriched mixture gas discharge part of the carbon dioxide-enriched mixture gas generation device 71, via a suction pump 73 similar to the suction pump 72. The outlet port 711d of the first-stage $CO_2$ separation membrane module 711 is connected to a tank 90. An outlet port 712d of the second-stage $CO_2$ separation membrane module 712 is connected to the inlet port 711a of the first-stage $CO_2$ separation membrane module 711.

As above, the carbon dioxide-enriched mixture gas generation device 71 according to this embodiment comprises multistage series-connected $CO_2$ separation membranes, wherein carbon dioxide contained in plant emission gas is highly enriched through the $CO_2$ separation membranes, and sent to the mixture gas buffer vessel 74 disposed in the carbon dioxide-enriched mixture gas discharge part. The mixture gas buffer vessel 74 is connected to the carbon dioxide conversion device 72.

In the embodiment illustrated in FIG. 2, the carbon dioxide conversion device 72 is comprised of a formate formation reaction vessel configured to induce a reaction between carbon dioxide contained in the carbon dioxide-enriched mixture gas and hydrogen, in a solution containing a metal salt or an organic salt to form formate. Therefore, the carbon dioxide conversion device 72 comprises: a formate formation reaction vessel 82 connected to the mixture gas buffer vessel 74 of the carbon dioxide-enriched mixture gas generation device 71, and a hydrogen tank 80; and a solution tank 89 configured to store therein a solution containing a metal salt or an organic salt and replenish the solution to the formate formation reaction vessel 82. Formate as a reaction product is extracted from the bottom of the formate formation reaction vessel 82, and sent to a formate enrichment and solidification tank 86 via a pump 84. A final residual gas remaining in the formate formation reaction vessel 82 after the reaction is sent to the inlet port 711a of the first-stage $CO_2$ separation membrane module 711 of the carbon dioxide-enriched mixture gas generation device 71 vie a line 88 provided in a discharge part of the carbon dioxide conversion device 72. The above-mentioned metal salt may include an alkali metal salt and an alkaline-earth metal salt, and is preferably an alkali metal salt. As the alkali metal salt, it is possible to use a mineral salt of an alkali metal. One type of alkali metal salt may be used alone, or a plural types of alkali metal salts may be used in combination.

A metal ion constituting a cation part of the alkali metal salt may include lithium, sodium, potassium, rubidium and cesium ions. Among these alkali metal ions, a sodium ion and a potassium ion are preferable.

An anion part of the alkali metal salt is not particularly limited as long as it is capable of forming alkali metal formate. Examples of the anion part include hydroxide ion ($OH^-$), chloride ion ($Cl^-$), bromide ion ($Br^-$), iodide ion (II, nitrate ion ($NO_3^-$), sulfate ion ($SO_4^{2-}$), phosphate ion ($PO_4^{3-}$), borate ion ($BO_3^{3-}$), hydrogen carbonate ion ($HCO_3^-$), and carbonate ion ($CO_3^{2-}$), wherein it is preferable to include at least one selected from them.

Specific examples of the alkali metal salt include lithium hydroxide, sodium hydroxide, potassium hydroxide, rubidium hydroxide, cesium hydroxide, lithium chloride, sodium chloride, potassium chloride, rubidium chloride, cesium chloride, lithium sulfate, sodium sulfate, potassium sulfate, rubidium sulfate, cesium sulfate, lithium hydrogen carbonate, sodium hydrogen carbonate, potassium hydrogen carbonate, rubidium hydrogen carbonate, cesium hydrogen carbonate, lithium carbonate, sodium carbonate, potassium carbonate, rubidium carbonate, and cesium carbonate. From the viewpoint that a byproduct is less likely to be mixed when alkali metal formate is formed, and operations in and after the second step become less complicated, alkali metal hydroxide salts, alkali metal hydrogen carbonate, or alkali metal carbonate are preferable; sodium hydroxide, potassium hydroxide, sodium hydrogen carbonate, potassium hydrogen carbonate, sodium carbonate, or potassium carbonate is more preferable; and sodium hydrogen carbonate or potassium hydrogen carbonate is particularly preferable.

The above-mentioned organic salt may include diazabicycloundecene and triethylamine.

In the first-stage $CO_2$ separation membrane module 711 of the carbon dioxide-enriched mixture gas generation device 71, the outlet port 711d thereof is connected to a carbon dioxide adjustment tank 90 comprised in the final treatment device 73. The final treatment device 73 is provided with the direct air capture device 30 which is also connected to the carbon dioxide adjustment tank 90. The carbon dioxide adjustment tank 90 is configured to mix the ambient air taken in by the direct air capture device 30, and the residual mixture gas from the outlet port 711d of the first-stage $CO_2$ separation membrane module 711, and send the resulting mixture gas to a final treatment vessel 92 in the final treatment device 73. An adsorbent 92a is disposed inside the final treatment vessel 92.

The adsorbent 92a is a carbon dioxide filer formed of a material capable of adsorbing carbon dioxide in a carbon dioxide-containing gas under an adsorption condition, and desorbing the adsorbed carbon dioxide under a desorption condition. Examples of a material usable for the adsorbent 92a include an amine epoxy based polymer described in the Patent Document 1. The adsorbent 92a is capable of adsorbing carbon dioxide at room temperature as the adsorption condition, and desorbing the adsorbed carbon dioxide at a high temperature, e.g., about 100° C., as the desorption condition.

Figure 4:
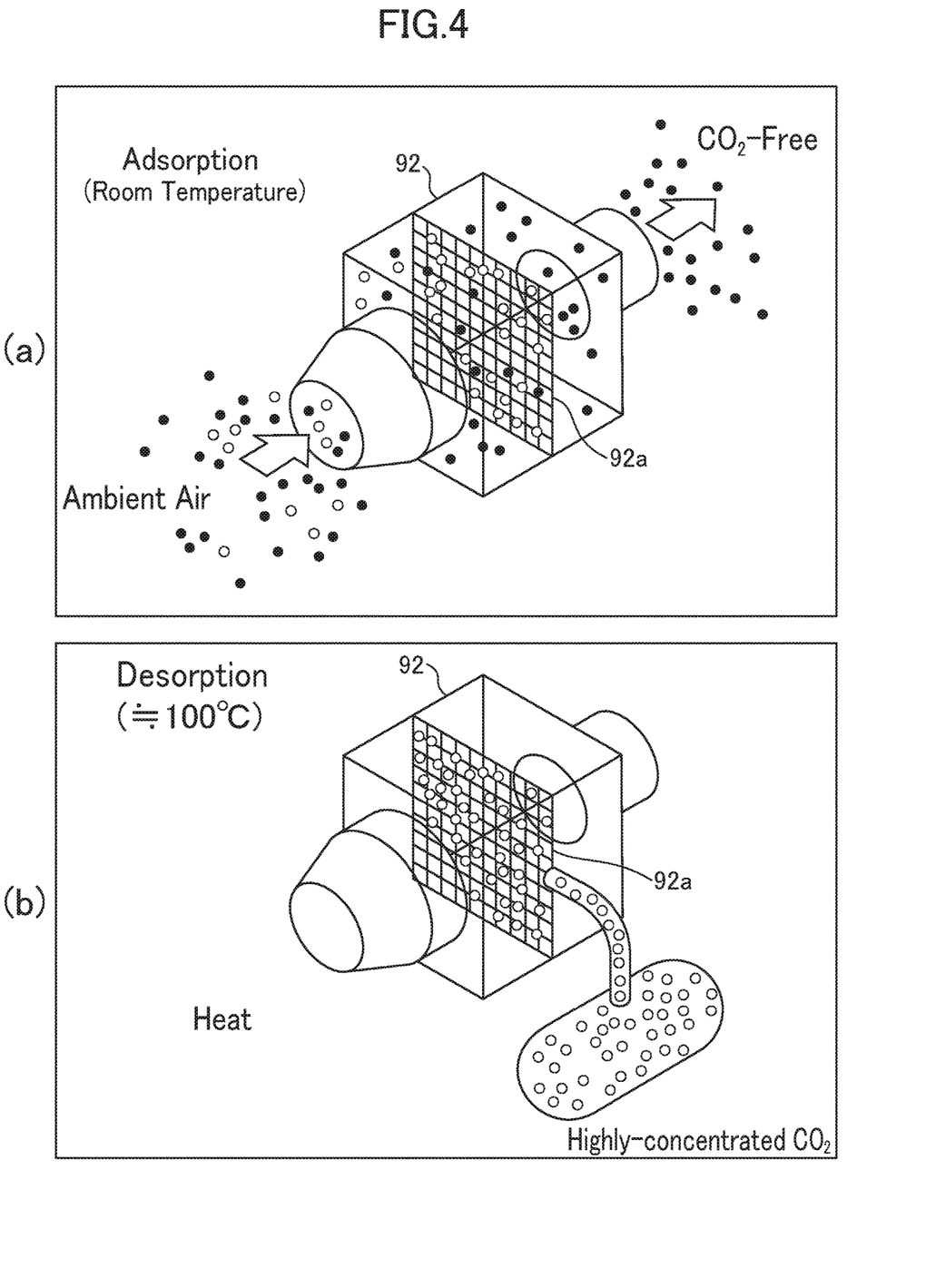

These states are shown in FIG. 4(a) and FIG. 4(b), respectively.

Under the adsorption condition at room temperature as shown in FIG. 4(a), the mixture gas sent to the final treatment vessel 92 in the final treatment device 73 passes through the final treatment vessel 92 by a suction action given from a fan 94, and in this process, carbon dioxide in the mixture gas is adsorbed onto the adsorbent 92a. As a result, a substantially carbon dioxide-free gas is discharged from the final treatment vessel 92.

Then, under the desorption condition at a high temperature, e.g., about 100° C., as shown in FIG. 4(b), a suction pump 96 connected to the final treatment vessel 92 as shown in FIG. 2 is activated to collect a highly-concentrated carbon dioxide-containing gas including carbon dioxide desorbed from the adsorbent 92a.

Although the above embodiment has been described based on an example where a highly-concentrated carbon dioxide-containing gas including carbon dioxide adsorbed in the final treatment device 73 is collected, the present invention is not limited thereto. For example, instead of collecting the highly-concentrated carbon dioxide-containing gas including carbon dioxide adsorbed in the final treatment device 73, the highly-concentrated carbon dioxide-containing gas including carbon dioxide adsorbed in the final treatment device 73 may be sent to the carbon dioxide conversion device 72 via the second-stage $CO_2$ separation membrane module 712 or the mixture gas buffer vessel 74.

Figure 3:
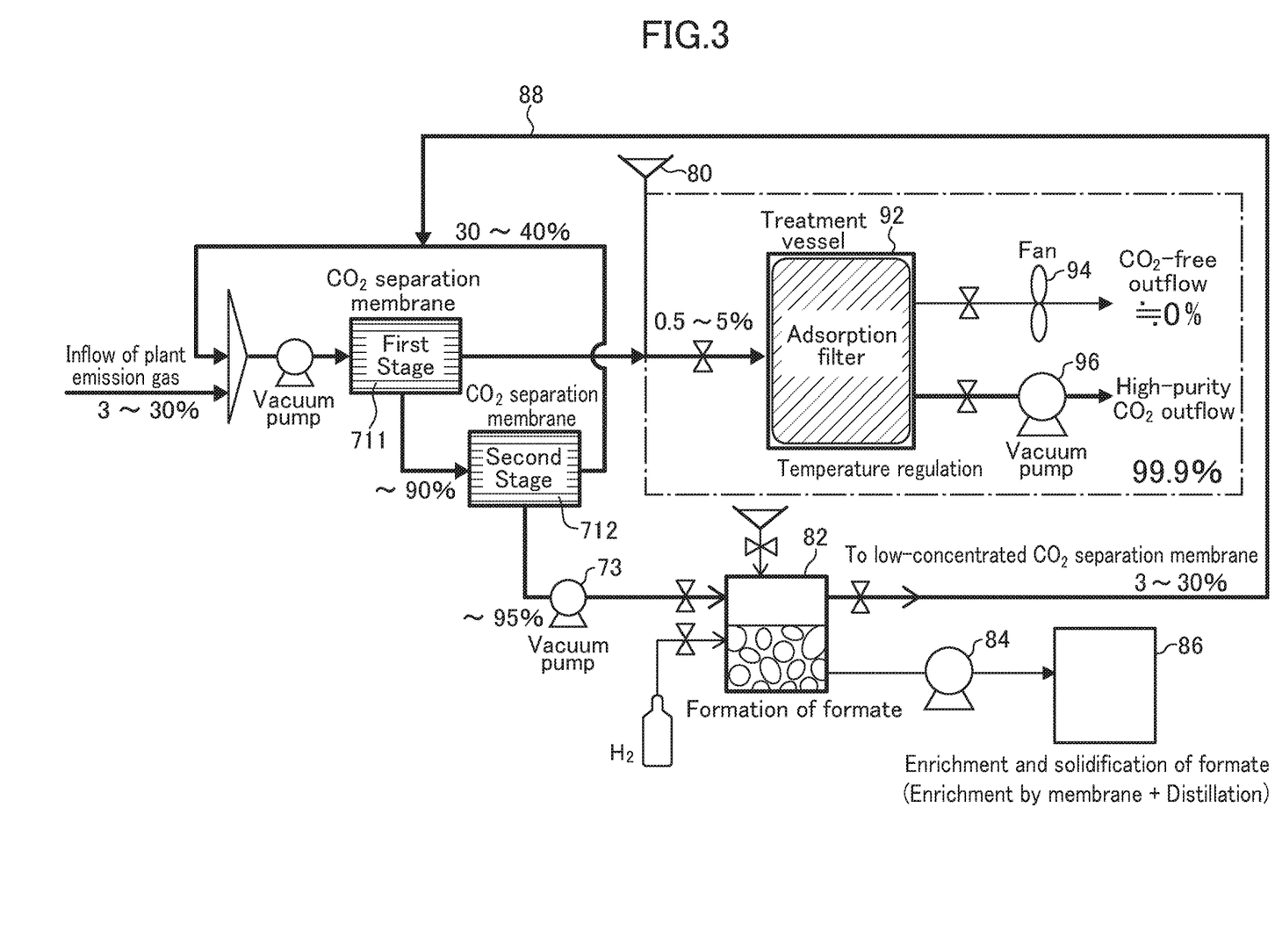
FIG. 3 is a schematic diagram showing another example of the carbon-dioxide capture and treatment system usable in the $CO_2$ negative emissions plant.

FIG. 3 is a system diagram of a carbon-dioxide capture and treatment system according to another embodiment of the present invention. An element or component corresponding to that in the embodiment illustrated in FIG. 2 is assigned with the same reference sign as that in FIG. 2, and its description will be omitted.

In this embodiment, a low-concentrated carbon dioxide-containing gas exiting from the second-stage $CO_2$ separation membrane module 712 is returned to the first-stage $CO_2$ separation membrane module 711 again, and separation by the first-stage and second-stage $CO_2$ separation membrane modules 711, 712 will be repeated. Further, a final residual gas remaining in the formate formation reaction vessel 82 after the reaction in the formate formation reaction vessel 82 is also extracted from the formate formation reaction vessel 82 and returned to the first-stage $CO_2$ separation membrane module 711 through the line 88.

Figure 5:
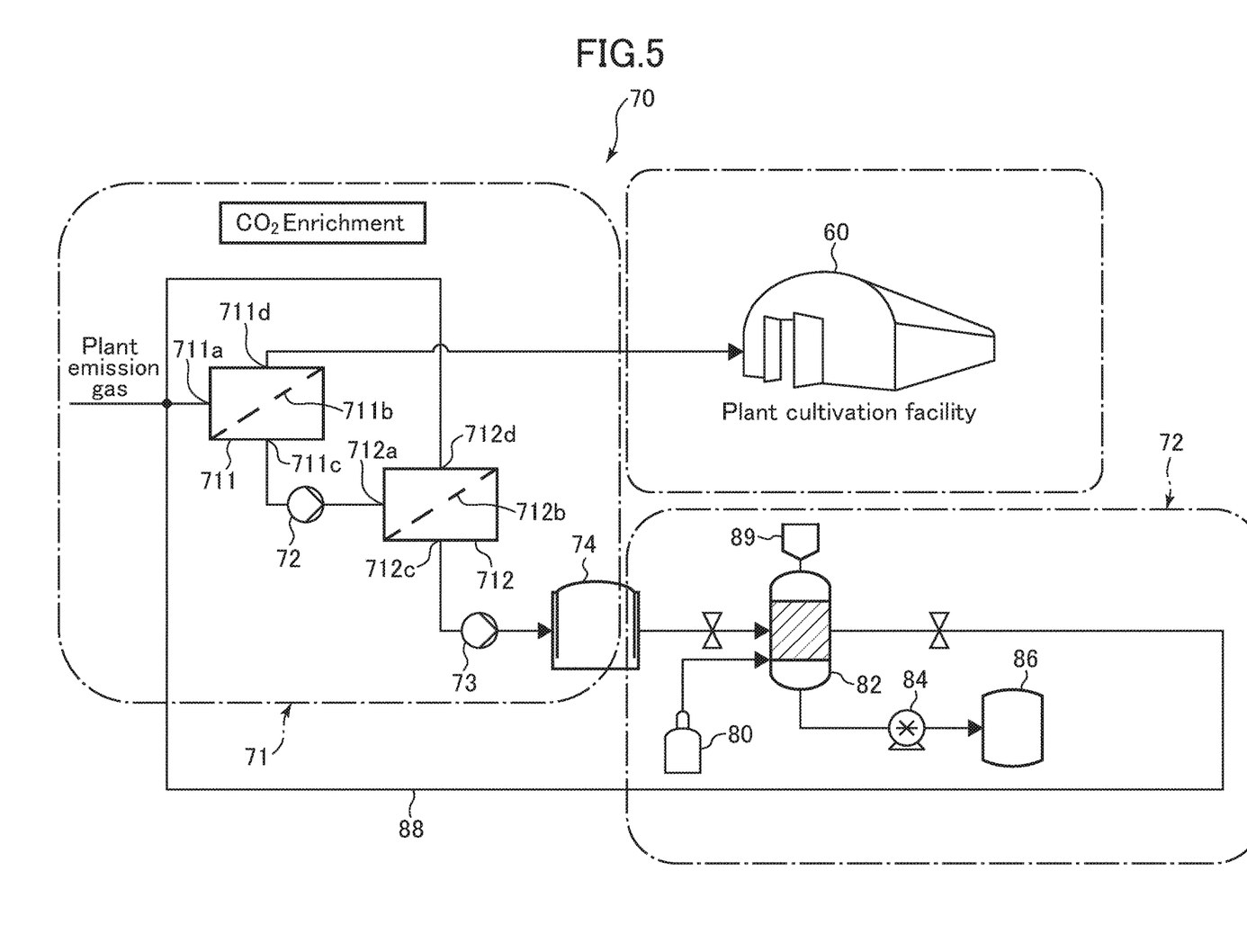
FIG. 5 is a schematic diagram showing one example of a carbon-dioxide capture and treatment system having a configuration for supplying part of captured carbon dioxide to a plant cultivation facility.

FIG. 5 is a system diagram of a carbon-dioxide capture and treatment system, showing one example of the relationship of connection between the carbon dioxide-enriched mixture gas generation device 71 and a plant cultivation facility 60, which allows carbon dioxide to be supplied from the carbon dioxide-enriched mixture gas generation device 71 to the plant cultivation facility 60. In FIG. 5, an element or component similar to that in FIG. 2 is assigned with the same reference sign as that in FIG. 2, and its description will be omitted.

As shown in FIG. 2, the plant cultivation facility 60 is connected to the carbon dioxide-enriched mixture gas generation device 71 to receive a mixture gas containing a low-concentrated carbon dioxide from the outlet port 711*d* of the first-stage $CO_2$ separation membrane module 711 of the carbon dioxide-enriched mixture gas generation device 71. In this case, a carbon dioxide concentration of the mixture gas to be supplied to the plant cultivation facility 60 is adjusted to become optimal for the plant cultivation facility 60.

As is evident from the above, according to the present invention which can be implemented by the above embodiments, carbon dioxide emitted in a plant is completely treated within the plant, without being emitted to the outside of the plant. Further, air is taken in from an ambient environment around the plant, and carbon dioxide contained in the taken-in air is separated and treated within the plant, so that carbon dioxide emissions from the entire factory have a negative value. Therefore, the present invention makes it possible to establish a plant capable of achieving $CO_2$ negative emissions.

LIST OF REFERENCE SIGNS

100: $CO_2$ negative emissions plant
10: tape manufacturing facility
20: emission gas collection and treatment building
30: direct air capture device
40: first power generation facility
50: second power generation facility
60: plant cultivation facility
70: carbon-dioxide capture and treatment system
71: first-stage $CO_2$ separation membrane module
72: carbon dioxide conversion device
73: final treatment device
711, 712: $CO_2$ separation membrane module
74: mixture gas buffer vessel
80: hydrogen tank
82: formate formation reaction vessel
86: formate enrichment and solidification tank

The invention claimed is:

1. A carbon-dioxide negative emissions plant comprising:
   a facility which produces emissions including carbon dioxide during its operation; and
   a carbon-dioxide capture and treatment system comprising:
   a carbon dioxide-enriched mixture gas generation device comprising an introduction part for taking in a carbon dioxide-containing mixture gas including at least the emissions from the facility, a separation membrane capable of increasing a carbon dioxide concentration of the mixture gas, thereby generating a carbon dioxide-enriched mixture gas, an enriched mixture gas discharge part for discharging the carbon dioxide-enriched mixture gas, and a residual mixture gas discharge part for discharging a residual mixture gas containing a low-concentrated carbon dioxide remaining after generation of the carbon dioxide-enriched mixture gas;
   a carbon dioxide conversion device connected to the enriched mixture gas discharge part of the carbon dioxide-enriched mixture gas generation device to receive the carbon dioxide-enriched mixture gas from the carbon dioxide-enriched mixture gas generation device, wherein the carbon dioxide conversion device is configured to convert carbon dioxide in the received carbon dioxide-enriched mixture gas into a chemically stable compound, and discharge a final residual gas remaining after the conversion, from a discharge part of the carbon dioxide conversion device;
   a final treatment device comprising an adsorbent capable of adsorbing carbon dioxide, thereby separating the carbon dioxide from other gas components, wherein the final treatment device is configured to receive the final residual gas from the discharge part of the carbon dioxide conversion device, and after adsorbing by the adsorbent a residual carbon dioxide in the final residual gas received from the carbon dioxide conversion device, discharge a substantially carbon dioxide-free gas; and
   a carbon dioxide direct capture device configured to take in air contained in an ambient environment, and supply the taken-in air to the final treatment device or an upstream side thereof in the carbon-dioxide capture and treatment system.

2. The carbon-dioxide negative emissions plant as recited in claim 1, wherein the carbon-dioxide capture and treatment system is configured such that the enriched mixture gas discharge part is in a reduced-pressure state, and the emissions from the facility are introduced into the introduction part of the carbon dioxide-enriched mixture gas generation device.

3. The carbon-dioxide negative emissions plant as recited in claim 1, wherein the separation membrane of the carbon dioxide-enriched mixture gas generation device is composed of a plurality of series-connected separation membranes.

4. The carbon-dioxide negative emissions plant as recited in claim 1, wherein the carbon-dioxide capture and treatment system is configured such that the final residual gas from the discharge part of the carbon dioxide conversion device is transferred to the final treatment device via the carbon dioxide-enriched mixture gas generation device.

5. The carbon-dioxide negative emissions plant as recited in claim 1, wherein the carbon dioxide direct capture device is disposed to distribute the air taken in from the ambient environment to the final treatment device of the carbon-dioxide capture and treatment system.

6. The carbon-dioxide negative emissions plant as recited in claim 1, wherein the emissions including carbon dioxide, produced in the facility, has a carbon dioxide concentration of 1.5 wt % or more.

7. The carbon-dioxide negative emissions plant as recited in claim 1, wherein the final treatment device comprises a collection vessel, wherein the final treatment device is configured to collect carbon dioxide adsorbed by the adsorbent to the collection vessel under conditions of heating and/or reduced pressure, and wherein in the case where the collection is performed under heating, the final treatment device is configured to utilize exhaust heat from the facility for heating during the collection.

8. The carbon-dioxide negative emissions plant as recited in claim 1, wherein the carbon dioxide conversion device is configured to convert carbon dioxide in the received carbon dioxide-enriched mixture gas into carbonate, and discharge the resulting residual mixture gas from the discharge part of the carbon dioxide conversion device.

9. The carbon-dioxide negative emissions plant as recited in claim 1, wherein the carbonate is calcium carbonate.

10. The carbon-dioxide negative emissions plant as recited in claim 1, wherein the carbon-dioxide capture and treatment system is configured to be driven by natural energy.

11. A carbon-dioxide capture and treatment system for capturing and treating carbon dioxide, comprising:
    a carbon dioxide-enriched mixture gas generation device comprising an introduction part for taking in a carbon dioxide-containing mixture gas, a separation membrane capable of increasing a carbon dioxide concentration of the mixture gas, thereby generating a carbon dioxide-enriched mixture gas, an enriched mixture gas discharge part for discharging the carbon dioxide-enriched mixture gas, and a residual mixture gas discharge part for discharging a residual mixture gas containing a low-concentrated carbon dioxide remaining after generation of the carbon dioxide-enriched mixture gas;
    a carbon dioxide conversion device connected to the enriched mixture gas discharge part of the carbon dioxide-enriched mixture gas generation device to receive the carbon dioxide-enriched mixture gas from the carbon dioxide-enriched mixture gas generation device, wherein the carbon dioxide conversion device is configured to convert carbon dioxide in the received carbon dioxide-enriched mixture gas into a chemically stable compound, and discharge a final residual gas remaining after the conversion, from a discharge part of the carbon dioxide conversion device;
    a final treatment device comprising an adsorbent capable of adsorbing carbon dioxide, thereby separating the carbon dioxide from other gas components, wherein the final treatment device is configured to receive the final residual gas from the carbon dioxide conversion device, and after adsorbing by the adsorbent a residual carbon dioxide in the final residual gas received from the carbon dioxide conversion device, discharge a substantially carbon dioxide-free gas; and
    a carbon dioxide direct capture device configured to take in air contained in an ambient environment, and supply the taken-in air to the final treatment device or an upstream side thereof in the carbon-dioxide capture and treatment system.

12. The carbon-dioxide capture and treatment system as recited in claim 11, wherein the enriched mixture gas discharge part is in a reduced-pressure state, and emissions from plant facility are introduced into the introduction part of the carbon dioxide-enriched mixture gas generation device.

13. The carbon-dioxide capture and treatment system as recited in claim 11, wherein the carbon-dioxide capture and treatment system is configured such that the final residual gas from the discharge part of the carbon dioxide conversion device is transferred to the final treatment device via the carbon dioxide-enriched mixture gas generation device.

14. A carbon-dioxide negative emissions plant comprising:
    an emissions-producing facility which produces emissions including carbon dioxide during its operation;
    an emissions collection and separation facility configured to collect the emissions from the emissions-producing facility, and separate carbon dioxide from other components in the emissions to generate a carbon dioxide-containing gas;
    a conversion facility configured to receive the carbon dioxide-containing gas generated in the emissions collection and separation facility, from the emissions collection and separation facility, and convert carbon dioxide contained in the carbon dioxide-containing gas into a chemically stable hydrogen-containing compound;
    a first power generation facility configured to receive the hydrogen-containing compound from the conversion facility, and after generating electric power through decomposition of the received hydrogen-containing compound, supply the generated electric power to the emissions-producing facility;
    a second power generation facility configured to generate electric power by natural energy, and supply the generated electric power to the emissions-producing facility; and
    a carbon dioxide capture facility configured to capture carbon dioxide contained in an ambient environment, and the captured carbon dioxide to the conversion facility.

15. The carbon-dioxide negative emissions plant as recited in claim 14, further comprising a hydrogen generation facility configured to receive the hydrogen-containing compound from the conversion facility, and decompose the received hydrogen-containing compound to generate hydrogen, wherein the first power generation facility is operable to generate electric power by using, as an energy source, the hydrogen generated in the hydrogen generation facility, and supply the generated electric power to the emissions-producing facility.

16. The carbon-dioxide negative emissions plant as recited in claim 14, wherein the emissions collection and separation facility is provided with an enrichment device for generating a carbon dioxide-containing gas through the use of a separation membrane.

17. The carbon-dioxide negative emissions plant as recited in claim 16, wherein the separation membrane includes a plurality of separation membranes, wherein part of the plurality of separation membranes makes up the enrichment device, and the remaining one or more separation membranes make up a residual carbon dioxide separation device capable of separating a residual carbon dioxide remaining in a residual gas after generation of the carbon dioxide-containing gas by the enrichment device, from other components in the emissions.

18. The carbon-dioxide negative emissions plant as recited in claim 14, further comprising a plant cultivation facility, wherein the carbon-dioxide negative emissions plant is configured to supply at least part of the carbon dioxide-containing gas from the emissions collection and separation facility to the plant cultivation facility.

* * * * *